United States Patent [19]
Machan et al.

[11] Patent Number: 5,323,881
[45] Date of Patent: Jun. 28, 1994

[54] CONFIGURATION FOR A DISK BRAKE TORQUE TUBE

[75] Inventors: David D. Machan, North Canton; John G. Evrard, Akron, both of Ohio

[73] Assignee: Aircraft Braking Systems Corporation, Akron, Ohio

[21] Appl. No.: 870,079

[22] Filed: Apr. 17, 1992

[51] Int. Cl.[5] .......................................... F16D 55/36
[52] U.S. Cl. .......................... 188/71.5; 188/18 A
[58] Field of Search ................ 188/71.4, 71.5, 71.6, 188/72.1, 264 R, 264 A, 264 AA, 264 W; 301/6.1, 6.2, 6.8, 6.10; 192/70.19, 70.20

[56] References Cited

U.S. PATENT DOCUMENTS

| | | | |
|---|---|---|---|
| 2,441,140 | 5/1948 | Fishburn | 192/70.20 |
| 3,829,162 | 8/1974 | Stimson et al. | 301/6.2 |
| 3,977,631 | 8/1976 | Jenny | 188/71.5 |
| 3,983,974 | 10/1976 | Dowell et al. | 188/264 AA |
| 4,102,438 | 7/1978 | Rancourt | 188/218 X |
| 4,534,457 | 8/1985 | Eltze et al. | 192/70.20 |
| 4,696,376 | 9/1987 | Reynolds | 188/71.5 |
| 4,944,370 | 7/1990 | Chambers et al. | 188/71.5 |
| 5,005,676 | 4/1991 | Gassiat | 188/264 AA |

FOREIGN PATENT DOCUMENTS 681145 8/1939 Fed. Rep. of Germany ... 192/70.19

Primary Examiner—Robert J. Oberleitner
Assistant Examiner—Chris Schwartz
Attorney, Agent, or Firm—Lee A. Germain; Ray L. Weber

[57] ABSTRACT

A torque tube for an aircraft wheel and brake assembly is characterized by an annular, substantially cone-shaped, radially-extending backplate flange having a plurality of stiffening ribs which extend axially inboardly as radial extensions of various key surfaces, the key surfaces being adapted for engagement with alternating disks of a brake disk stack of the assembly. The stiffening ribs exhibit an axial dimension as may be defined by a pair of acute angles, a first acute angle establishing an outboard straight line surface of revolution which is continuous about the outboard end of the tube while a second acute angle establishes an inboard straight line surface of revolution in only the areas of the stiffening ribs. The backplate flange exhibits an axial dimension between the ribs as may be defined by a third acute angle which establishes a straight line surface of revolution between the adjacent ribs.

25 Claims, 5 Drawing Sheets

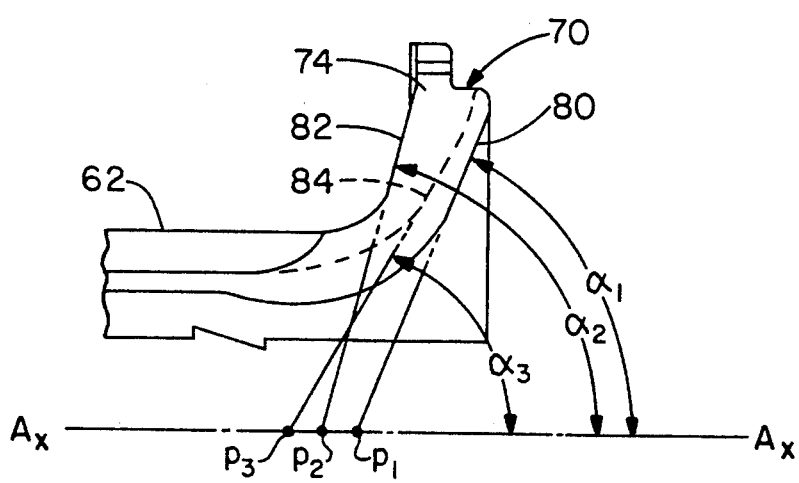
FIG.-6A
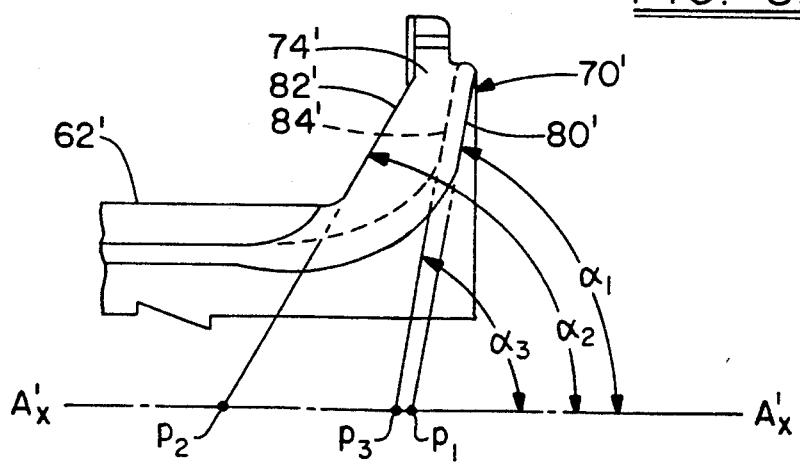
FIG.-6B
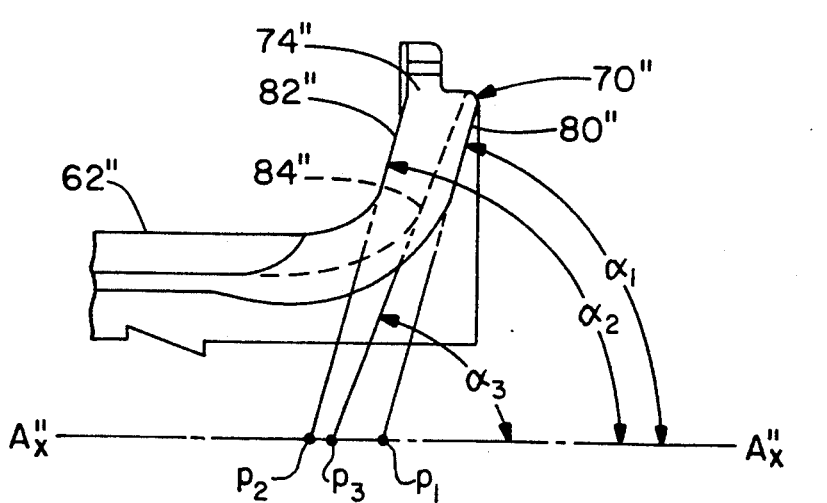
FIG.-6C
FIG.-6

CONFIGURATION FOR A DISK BRAKE TORQUE TUBE

FIELD OF THE INVENTION

This invention pertains generally to aircraft wheel and brake assemblies comprised of a multi-disk stack of braking elements wherein alternating ones of the stack are keyed for rotation with a wheel while others are keyed to a fixed torque tube to be non-rotating. The invention is to a configuration for a torque tube which is a primary functioning member of a disk brake assembly.

BACKGROUND OF THE INVENTION

A torque tube conventionally comprises a body that is substantially cylindrical terminating at an inboard end in a radially depending mounting flange and at an outboard end in a radially extending backplate flange. The inboard mounting flange is characterized by a plurality of bolt retaining bores which function to affix the torque tube to a member of the wheel and brake assembly which is relatively stationary with respect to any rotating members of the assembly. The torque tube body is characterized by a plurality of axially oriented and longitudinally extending key surfaces which are adapted for engagement with alternating ones of a brake disk stack so as to maintain the disks stationary relative to disks which are rotating with a wheel.

The backplate flange functions to engage the brake disk stack through an end plate disk such that the disk stack is clamped between it and a brake pressure plate at the inboard end of the disk stack. The pressure plate is a disk which functions to accept axial load forces imposed on it by a plurality of hydraulically-operated pistons carried within a brake housing member and these are responsive to a call for wheel braking in a well-known and practiced manner.

A torque tube is conventionally a one-piece forged or cast steel or other suitable metal member which is machined to close tolerance to obtain the necessary keying interconnections with specific ones of the brake disk stack. Multiple machining operations are usually necessary to achieve such close tolerance and this, of course, increases the cost of the torque tube. Ways are being sought to decrease the number of machining operations and thus reduce the cost of these very necessary and important members of a wheel and brake assembly. In addition and because the backplate flange must accept and absorb the very high axial load forces imposed during braking of a rotating aircraft wheel, various configurations of backplate ribs have been developed into the outboard end so as to strengthen and stiffen the backplate flange. While such ribs are effective in achieving this, they also tend to add to the overall weight of the torque tube which works against recent efforts to decrease the weight. Furthermore, the various outboard configured strengthening ribs are limited in design by the volume space and axial extent available within a specific wheel which carries the brake assembly.

It is, therefore, in accordance with a primary aspect of the present invention an object to provide a disk brake torque tube having a configuration of backplate flange stiffening ribs which may be easily changed to meet varying specifications of different configurations of wheel and brake assemblies.

In accordance with another aspect of the invention it is an object to provide a torque tube which may be machined to meet varying disk brake assembly criteria, which torque tube may be machined to reduce weight and provide enhanced thermal cooling while maintaining structural stiffness and integrity.

According to still another aspect of the invention it is an object to provide a torque tube for aircraft disk brake applications wherein backplate flange stiffening may be varied to meet and/or exceed fatigue life requirements imposed on these type applications.

In accordance with a further aspect of the present invention it is an object to provide a torque tube structure which comprises axially and longitudinally oriented key surfaces which may be machined in conjunction with backplate flange stiffening ribs while varying both the configurations and dimensions of either or both the keys and/or the ribs, the ribs being varied in either their axial width dimension and/or their transverse width dimension by merely changing angular relationships which define the ribs.

SUMMARY OF THE INVENTION

A torque tube as may be applied to aircraft wheel and brake assemblies comprised of a multi-disk stack of braking elements is configured to exhibit a substantially cone-shaped outboard end which comprises a backplate flange characterized by a plurality of stiffening ribs which extend inboardly as radial extensions of at least some of a plurality of disk keying surfaces, said ribs exhibiting an axial thickness dimension as may be defined by a pair of acute angles, a first angle having a center located at a point on the tube axis such as to establish an outboard straight line surface of revolution which is continuous about the outboard end of the body and a second angle having a center located at a point on the tube axis such as to establish an inboard straight line surface of revolution which is intermittent at each of the ribs, the backplate flange exhibiting an axial thickness dimension between the ribs as may be defined by a third acute angle having a center located at a point on the tube axis such as to establish an inboard straight line surface of revolution between adjacent ribs.

BRIEF DESCRIPTION OF THE DRAWINGS

Various features and advantages of the present invention will be better understood and appreciated from a consideration of the following detailed description of the preferred embodiments when taken in conjunction with the accompanying drawings, in the several figures in which like-parts and/or elements bear like reference numerals or letters and wherein:

FIG. 6, comprising FIGS. 6A, 6B, and 6C diagramatically illustrates particular relationships which may be varied to produce at least three different embodiments to meet differing requirements of various type brake assemblies.

DESCRIPTION OF THE PREFERRED EMBODIMENTS

Figure 1:
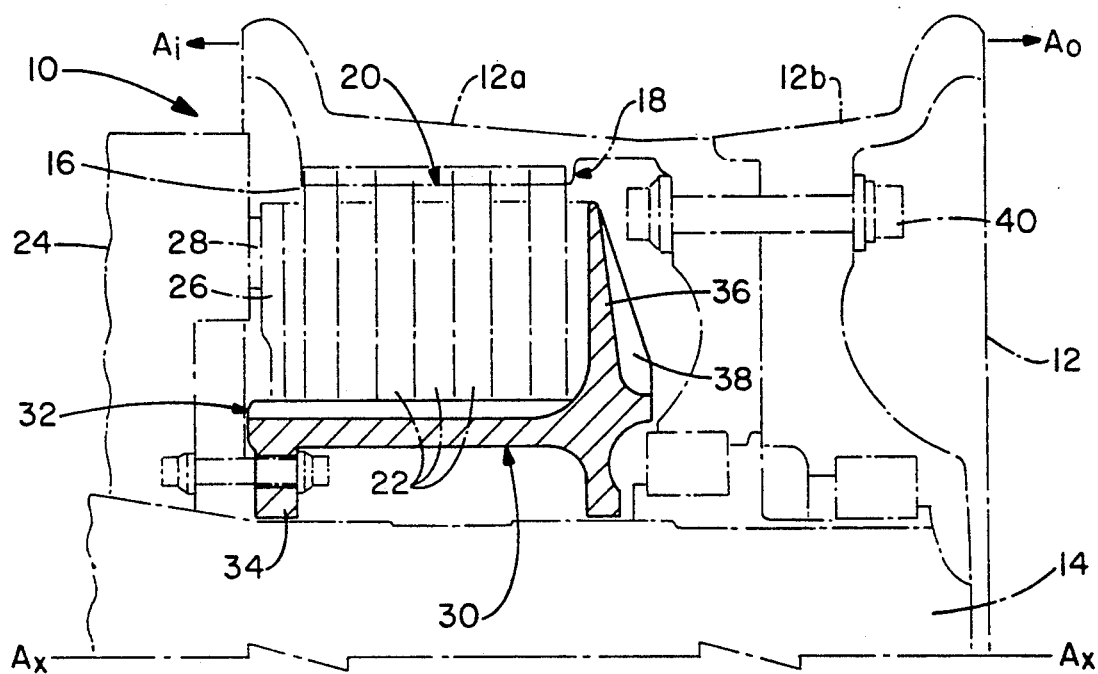
FIG. 1 is a partial cross-sectional elevational view as may be taken axially with reference to an axis of rotation of an aircraft wheel and brake assembly, the illustration being but a one-quarter section of a prior art assembly wherein portions pertinent to the invention are shown in solid lines while other elements forming the environment are illustrated in dot-dashed ghost lines.

Referring to the drawings, FIG. 1 illustrates a prior art wheel and brake assembly generally indicated by reference numeral 10 wherein a conventional torque tube 30 is shown in solid lines as such pertains to the present inventive concept while other elements of the assembly are shown in ghost lines for the purpose of illustrating the environment of the torque tube. Generally, the assembly 10 comprises a wheel 12 mounted for rotation about an axle 14 in a conventional manner, the axis of rotation being a central longitudinal axis as indicated at line Ax—Ax in the figure. In this respect, it will be recognized that the showing of FIG. 1 is a one-quarter section of a wheel and brake assembly and that the primary functioning elements thereof exhibit an axis of revolution which is coincident with the Ax axis.

The assembly 10 further comprises a brake sub-assembly generally indicated at reference numeral 20 which is mounted inboardly of the wheel 12 and within a wheel bore or cavity 16 formed by the configuration of the wheel. The inboardly direction of the wheel and brake assembly 10 is indicated by the reference arrow $A_i$ while the outboardly direction is indicated by the reference arrow $A_o$. The brake sub-assembly 20 comprises a brake disk stack of braking elements 22 wherein alternating ones are keyed at 18 for rotation with the wheel 12 while others are keyed at 32 to the torque tube 30 for relative fixed positioning with respect to the rotating disks. The torque tube 30 is mounted about the wheel axle 14 and it conventionally includes a mounting flange 34 which is bolted or otherwise affixed to a brake housing 24 or other relatively stationary member of the wheel and brake assembly 10.

The torque tube 30 is further characterized by a radially extending backplate flange 36 which forms an integral part of the tube body structure at its outboard end. The backplate flange 36 functions to axially maintain the brake disks 22 between it and a brake pressure plate 26 mounted at the inboard end of the brake disk stack. The pressure plate 26 is forced to move axially and outboardly by action of a plurality of pistons 28 which are hydraulically actuated within cylinders in the brake housing 24. The piston movement is responsive to signals for effecting wheel braking action.

From the foregoing description of FIG. 1, it should be apparent that the torque tube 30 comprises a primary functioning member of a wheel and brake assembly and that its backplate flange 36 is important in carrying the very high axial load forces imposed during braking of an aircraft wheel 12. It is well-known and recognized in this art that torque tube stiffness is critical to brake performance in that low backplate flange deflection is a contributing factor in limiting hydraulic fluid displacement in the operation of the pistons 26. Backplate stiffness also inhibits vibration in the brake assembly and efforts have been made to accomplish this by the addition of a plurality of stiffening ribs 38 formed or otherwise machined into the outboard end of the flange structure. This solution, however, adds unwanted weight and it can be appreciated from the showing of FIG. 1 that the axial extent of the wheel bore 16 may limit rib design especially when the wheel 12 is comprised of wheel halves 12a and 12b which are maintained in clamped position by a number of wheel bolts 40. The wheel bolts 40 extend axially inboardly into the wheel bore 16 and these obviously cannot interfere with the torque tube 30 and/or any other members of the brake sub-assembly 20.

Figure 2:
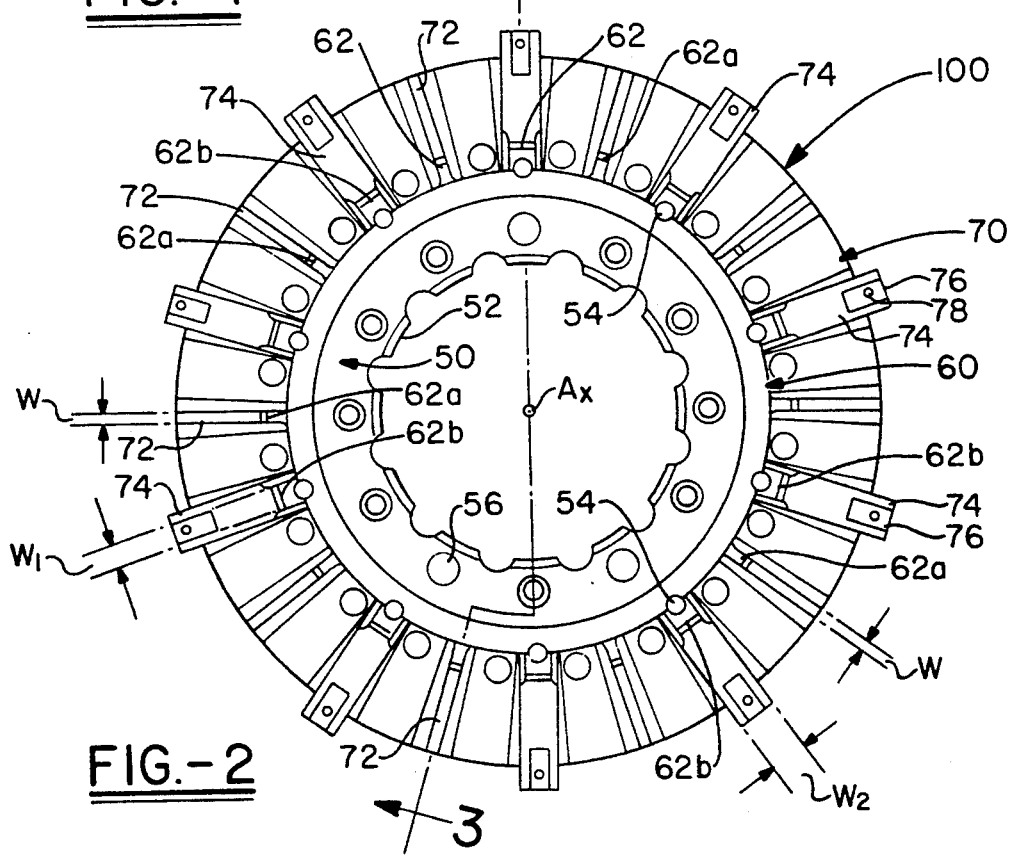
FIG. 2 is an end elevational view of the torque tube comprising the present invention as may be taken from an inboard end towards an outboard end as such torque tube may be applied to an aircraft wheel and brake assembly.

Referring now to FIG. 2 of the drawings, a torque tube according to the present invention is illustrated and very generally indicated by reference numeral 100. The figure is an end elevational view as may be taken from the inboard end toward the outboard end and the tube generally comprises (i) an inboard mounting flange 50, (ii) a cylindrical body 60, and (iii) an outboard backplate flange 70.

The inboard mounting flange 50 depends radially towards the tube longitudinal Ax axis and it has a central bore 52 adapted for through-passage of a wheel axle (not shown) in a similar manner as illustrated in FIG. 1. The flange 50 may be characterized by a plurality of mounting bores 54 which are variously located such that mounting bolts associated with a brake housing or other stationary member of a wheel and brake assembly may draw the torque tube 100 into proper alignment and maintain it in a fixed position thereto.

Figure 3:
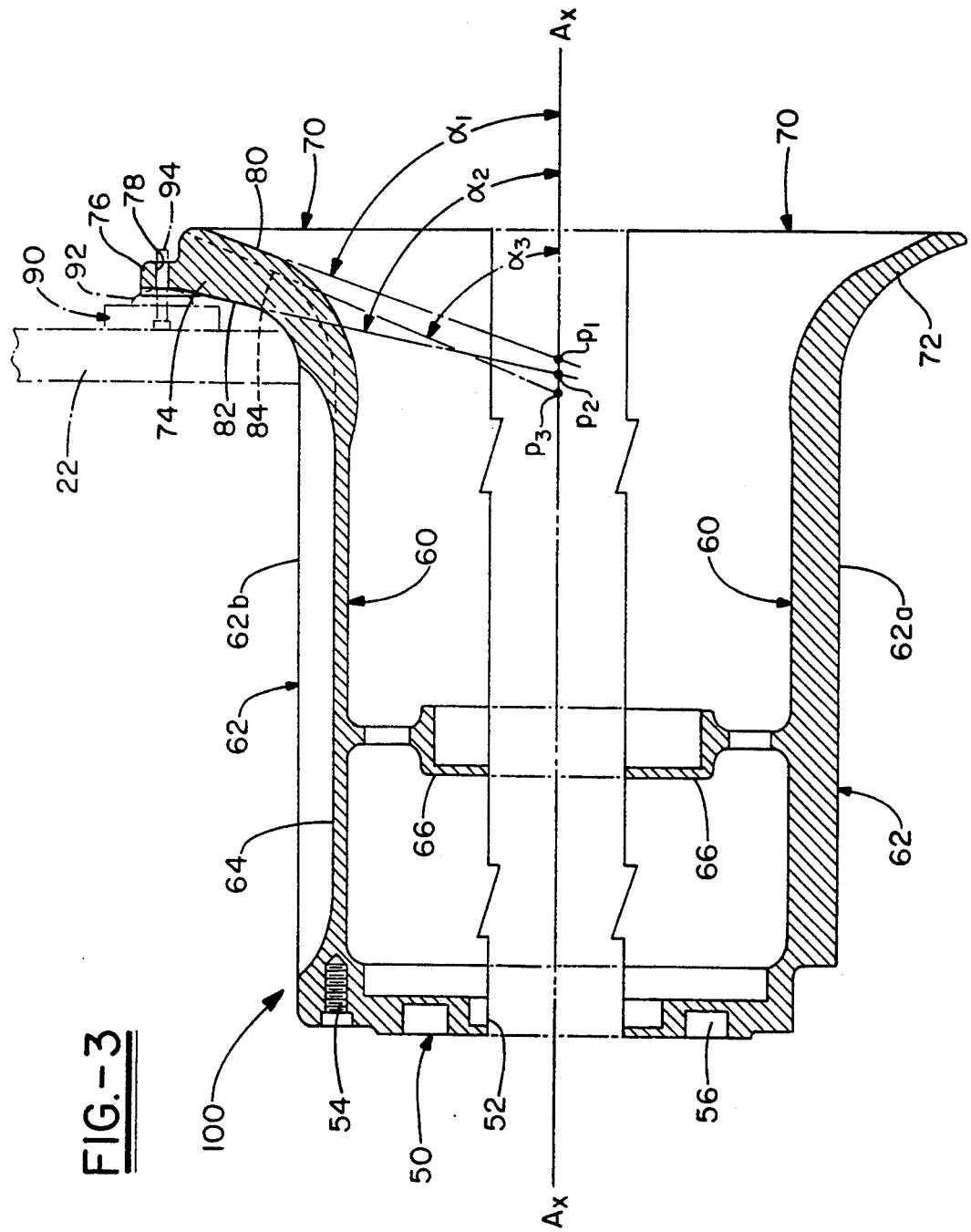
FIG. 3 is a partial cross-sectional view as may be taken on line 3—3 of FIG. 2, the longitudinal axis of the torque tube being indicated at line Ax—Ax.

Referring now also to FIG. 3 of the drawings, the torque tube body 60 is more clearly illustrated in a longitudinal cross-section as may be taken on line 3—3 of FIG. 2. The body 60 is substantially cylindrical and it is characterized by a plurality of axially oriented and longitudinally extending key surfaces generally indicated at reference numeral 62.

The key surfaces 62 extend radially a specific distance and function to engage alternate ones of a brake disk stack (not shown) so as to maintain them non-rotating with respect to others of the stack which are keyed to a rotating wheel as described with reference to FIG. 1. The key surfaces 62 may comprise keys 62a that exhibit a transverse width dimension "W" which may be a lower limit for a particular aircraft application. The keys 62 may also comprise keys 62b that exhibit a transverse width dimension "$W_1$" and this may be a practical upper limit for a particular aircraft application. It should be noted that the keys 62b are characterized by a longitudinal slot 64 which eliminates excessive weight in such wider key configurations. Either of the key configurations 62a or 62b may be applied to a torque tube 100 or they may be used in combination as illustrated in FIG. 2. Torque tube key configurations of the type described are well-known in this art and the present invention, therefore, is not considered limited by the configurations of the keys shown in the figures. These are merely for the purpose of illustrating the invention and not for limiting the same.

Figure 5:
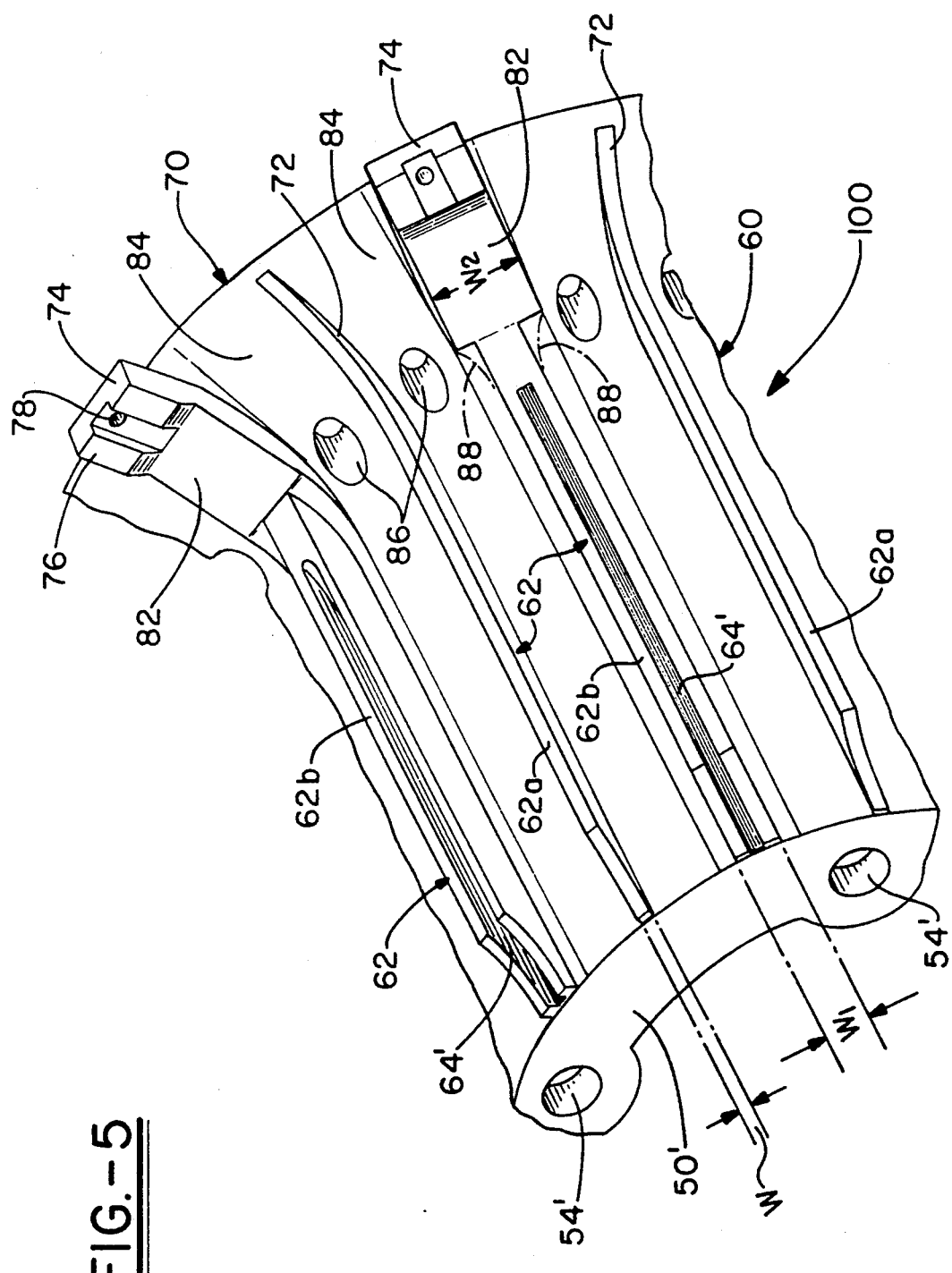
FIG. 5 is a partial perspective view of a torque tube according to the invention illustrating features and/or elements which may be varied to meet criteria of different configurations of aircraft wheel and brake assemblies.

Continuing with FIG. 3, it should be noted that the slots 64 in the keys 62b terminate short of the inboard end of the tube body 60 such as to provide a sufficient length of solid material to accomodate a first configuration of tube mounting bores 54. The bores 54 are drilled or otherwise formed and threaded to accept mounting bolts associated with a stationary member of a wheel and brake assembly to draw the torque tube into fixed position. An alternative configuration of torque tube mounting bores is illustrated in FIG. 5 of the drawings wherein through-bores 54' are drilled or otherwise formed in the material comprising a mounting flange 50'. In this configuration, the key slots 64' extend inboardly to the end of a key 62b and this eliminates any additional weight of material which was necessary for accomodating the bores 54 of FIG. 3. The various configurations of inboard mounting flanges 50 and 50' are well-known in this art and the invention is not considered limited to the particular ones illustrated in the drawings.

Figure 4:
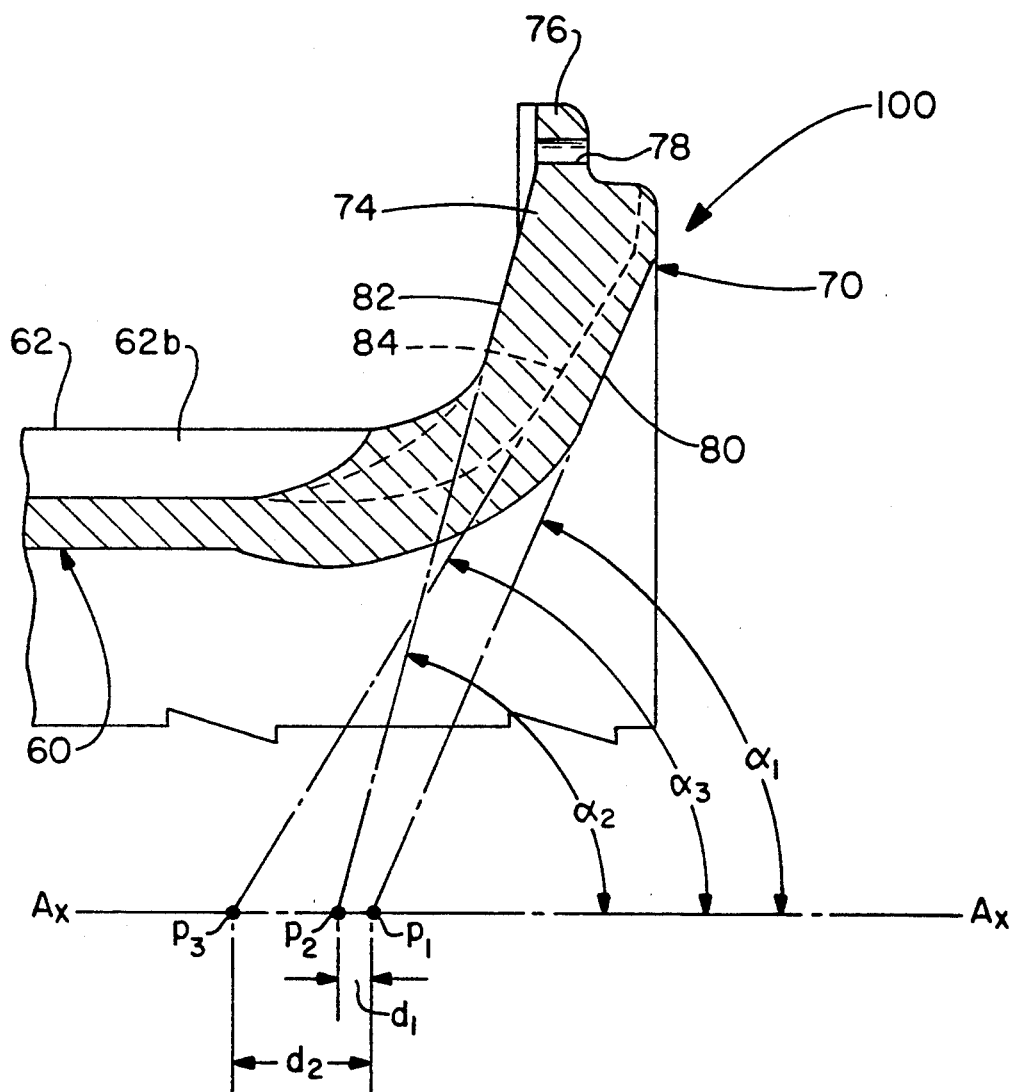
FIG. 4 is an elevational view, in partial cross-section, of the outboard end of the torque tube illustrating particular features of a backplate flange which are important to the inventive concept.

Referring now also to FIG. 4 of the drawings, a backplate flange in accordance with this invention is generally indicated by reference numeral 70. The backplate flange 70 forms an integral part of the torque tube structure and it is a substantially cone-shaped configuration, the base of the cone being a radial extension of the torque tube body 60 at its outboard end. The backplate flange 70 is characterized by a plurality of stiffening rib portions 72 and 74, the ribs 72 being radial extensions of the various keys 62a while the ribs 74 are radial extensions of the various keys 62b. The stiffening ribs 72 and 74 are interconnected by web-like portions 84 which are radial extensions of the torque tube body at its outboard end.

While it can be seen from the drawing that the ribs 72 are substantially tapered into the backplate flange 70, the stiffening ribs 74 are extended a greater axial distance in the inboardly direction. This increases the axial thickness dimension of the ribs 74 so as to be configured with radial extensions 76 which function to carry self-aligning backplate pucks, one such puck illustrated in dot-dashed ghost lines and generally indicated at reference numeral 90. The backplate puck 90 is a conventional piece applied to these type of brake assemblies to maintain alignment and/or orientation of the brake disks of a brake disk stack by engagement with an endplate disk indicated at reference numeral 22. Self-alignment may be accomplished by way of an outboardly positioned, substantially curvalinear extension 92 which allows the puck to rotate about a mounting pin 94 carried within a bore 78 in the backplate flange extension 76.

The backplate flange ribs 74 are defined by a pair of acute angles $\alpha_1$ and $\alpha_2$ which are both referenced to the central longitudinal Ax axis of the torque tube 100. The acute angle $\alpha_1$ is defined by a straight line portion 80 of the backplate flange 70 and it has a center $p_1$ located on the Ax axis. The straight line portion 80 establishes an outboard surface of revolution forming the base of the cone-shaped outboard end of the torque tube 100. The acute angle $\alpha_2$ is defined by a straight line portion 82 of the backplate flange 70 and it has a center $p_2$ located on the Ax axis. The straight line portion 82 establishes an inboard surface of revolution which is not continuous, but rather, is intermittent and forms the inboard extent of the ribs 74.

The backplate flange 70 is also characterized by web-like portions 84 which interconnect the ribs 72, 74 and these are defined by a third acute angle $\alpha_3$. The portions 84 are straight line portions established by acute angle $\alpha_3$ which has a center $p_3$ located on the Ax axis. The acute angle $\alpha_3$ is shown in dashed lines in FIGS. 3 and 4 while the straight line surfaces of revolution 84 are clearly illustrated in the perspective view of FIG. 5 of the drawings. Thus, the axial thickness dimension of the backplate flange 70 between the ribs is established by a combination of straight line surfaces of revolution 80 and 84 as these are defined by acute angles $\alpha_1$ and $\alpha_3$ respectively.

In the showing of FIG. 4, the acute angles $\alpha_1$ and $\alpha_2$ are shown as having centers $p_1$ and $p_2$ located on the Ax axis and separated by a distance "$d_1$". It will be recognized that the centers $p_1$ and $p_2$ may be moved along the Ax axis and, for any particular values of the angles $\alpha_1$ and $\alpha_2$, the axial thickness dimension of the ribs 74 will either increase or decrease depending upon whether the centers are moved axially inboardly or outboardly along the Ax axis. In this respect also, the centers $p_1$ and $p_2$ may be coincident on the axis i.e., located at the same point on the Ax axis. It will also be recognized that the center $p_3$ of the acute angle $\alpha_3$ may be moved along the Ax axis in relative position to the center $p_1$ of angle $\alpha_1$ to establish a changing separation "$d_2$" between the two. This, of course, will vary the axial thickness of the backplate flange portions 84 between the ribs.

Referring now also to FIG. 6 of the drawings, three embodiments of a torque tube backplate flange having stiffening ribs according to this invention are illustrated diagramatically in FIGS. 6A, 6B, and 6C as these may be generated by varying the acute angles $\alpha_1$, $\alpha_2$, and $\alpha_3$ respectively.

FIG. 6A illustrates diagrammatically a backplate flange configuration 70 as hereinbefore described with respect to FIGS. 3-5 wherein the acute angles $\alpha_1$ and $\alpha_2$ have centers $p_1$ and $p_2$ located on the Ax axis such that the angles define straight line surfaces of revolution 80 and 82. The surfaces 80 and 82 define an axial thickness dimension at the ribs 74 which increases as this may be measured radially from the tube body 60. In this configuration, acute angle $\alpha_1$ is less than acute angle $\alpha_2$ and it will be recognized that acute angle $\alpha_3$ may be varied with respect to either of the angles $\alpha_1$ and/or $\alpha_2$ or, it may be varied independently within the range of 0°-90° and still accomplish its purpose. Of course and as hereinbefore stated, for any particular values of the angles $\alpha_1$, $\alpha_2$, and/or $\alpha_3$ the respective centers $p_1$, $p_2$, and/or $p_3$ may be moved along the Ax axis to also effect a change in the axial thickness dimension of the backplate flange in both the ribs 74 and/or the portions 84 between the ribs.

FIG. 6B illustrates diagrammatically a backplate flange configuration 70' wherein the acute angles $\alpha_1$ and $\alpha_2$ have centers $p_1$ and $p_2$ located on the Ax' axis such that they define straight line surfaces of revolution 80' and 82' respectively. The surfaces 80' and 82' define an axial thickness dimension at the ribs 74' which decreases as this may be measured radially from the tube body. In this configuration, acute angle $\alpha_1$ is greater than angle $\alpha_2$ and it will be recognized that the acute angle $\alpha_3$ may be varied independently within the range of 0°-90° and still accomplish its intended purpose. Of course and as hereinbefore stated, for any particular values selected for $\alpha_1$, $\alpha_2$, and/or $\alpha_3$ the centers $p_1$, $p_2$, and/or $p_3$ may be moved along the Ax' axis to effect a change in the axial thickness dimension of the backplate flange 70' at the ribs 74' and/or the portions 84' between the ribs.

FIG. 6C illustrates diagrammatically a backplate flange configuration 70" wherein the acute angles $\alpha_1$ and $\alpha_2$ have centers $p_1$ and $p_2$ located on the Ax" axis such as to define straight line surfaces of revolution 80" and 82" respectively. The surfaces 80" and 82" define an axial thickness dimension at the ribs 74″ which remains constant as this may be measured radially from the tube body. In this configuration, acute angles $\alpha_1$ and $\alpha_2$ are equal angles and it will be recognized that acute angle $\alpha_3$ may be varied independently within the range of 0°–90° while accomplishing its intended purpose. Of course and as hereinbefore stated, the centers $p_1$, $p_2$, and/or $p_3$ may be moved along the Ax″ axis to also effect a change in the axial thickness dimension of either or both of the ribs 74″ and/or the portions 84″ between the ribs.

It has been determined that the acute angle $\alpha_1$ may be varied within the range of 35°–85° while the acute angle $\alpha_2$ may be varied within the range of 45°–90°. More particularly, the angle $\alpha_1$ may be varied within the range of 55°–75° while the angle $\alpha_2$ may be varied within the range of 62°–82°. For some torque tube applications, the angle $\alpha_1$ may be varied within the range of 63°–73° and the acute angle $\alpha_2$ may be varied within the range of 67°–77°. Of course angle $\alpha_3$ may be varied with respect to either of the angles $\alpha_1$ and/or $\alpha_2$ or varied independently within the range of 0°–90° as stated.

From the foregoing description, it will be recognized that the axial thickness dimensions of one or both of the stiffening ribs 74, 74′, 74″ and the flange portions 84, 84′, 84″ may be changed by varying the values of the acute angles $\alpha_1$, $\alpha_2$, and/or $\alpha_3$. Also, the axial thickness dimensions may be varied by changing the axial locations of the angle centers $p_1$, $p_2$, and $p_3$. In addition to this, it will be recognized and it is anticipated that the rib stiffness of the ribs 74, 74′, and 74″ may be changed by varying the inboard width dimension of the rib surface areas of revolution at 82, 82′, and 82″. The rib widthwise dimension is shown in FIG. 5 of the drawings at "$W_2$" and this dimension may be equal to or greater than either of the key surface width dimensions indicated at "W" and "$W_1$" in the drawing. For example, if a torque tube has key surfaces of the type shown at 62a, then the radial rib extensions 74, 74′, and 74″ may comprise the stiffening rib radial extensions of these type of keys. In this configuration, the keys 62a will be flared out to meet the width dimensions of $W_2$ of the backplate ribs. For example also, when the keys are of the type shown at 62b, either alone or in combination with keys 62a, these may exhibit a transverse width dimension "$W_1$" as indicated in the drawing. When the values of $W_1$ are less than the values of $W_2$ at the ribs, the key surfaces 62b may be flared out to meet the rib widths as this is indicated at 88 in the drawing. Of course, it is anticipated that the width dimension $W_1$ of the key surfaces 62b may be equal to the width dimension $W_2$ of the backplate flange ribs 74, 74′, and/or 74″.

From the foregoing description, it may be recognized and appreciated that various advantages are found in the torque tube backplate flange embodiments disclosed in FIGS. 6A, 6B, and/or 6C which comprise this invention. These may include designing for variations in overall torque tube weight, enhanced thermal cooling, and/or to meet or exceed fatigue-life requirements. For example, a forged or cast metal torque tube structure may be machined to various stiffening rib axial thickness dimensions as this may be accomplished by varying the acute angles $\alpha_1$, $\alpha_2$, $\alpha_3$ and/or by varying the locations of their centers $p_1$, $p_2$, $p_3$ along the Ax, Ax′, Ax″ axes. In addition, the transverse width dimension $W_2$ of the ribs 74, 74′, 74″ may be varied as this dimension relates directly to backplate flange fatigue-life. The overall weight of a torque tube may also be varied by a judicious selection of through-bores and/or recesses to eliminate metal found to be unnecessary for the structural integrity of the torque tube once a particular rib configuration 74, 74′, or 74″ is selected. This may include various key slot configurations 64, flange cavities 56, and/or a provision for a plurality of through-bores 86 as these are shown in FIG. 5 in the areas of the backplate flange radial portions 84. Of course, it is also anticipated that various geometrical configurations of through-bores and/or recesses or cavities may be applied as well as to increase or decrease their numbers to reduce torque tube weight. Further, and as illustrated in FIG. 3 of the drawings, a tube bore support leg 66 may be applied to engage a wheel axle in a well-known manner, which leg 66 functions to reduce vibration in the torque tube. While a support leg 66 will obviously increase torque tube weight, such additional weight may be balanced out by a selection of the backplate flange configuration and/or by a selection of through-bores of the type described above.

While certain representative embodiments and details have been shown for the purpose of illustrating the present inventive concept, it will be apparent to those persons skilled in this art that various changes and/or modifications may be made therein without departing from the spirit or scope of the invention.

What is claimed is:

1. An improved configuration for a torque tube as may be applied to an aircraft wheel and brake assembly, the assembly comprising a multi-disk stack of braking elements wherein various ones of the disks are keyed for rotation with a wheel while others are keyed to the torque tube which is fixedly secured to a relatively stationary member of the assembly, the improvement comprising in combination:

a cylindrical tube body having a central longitudinal axis, a substantially closed inboard end and an open outboard end, said body characterized by a plurality of radially extending key surfaces axially oriented and longitudinally extending from the inboard end toward the outboard end for engagement with various ones of a brake disk stack; and an annular, substantially cone-shaped radially extending backplate flange at the outboard end of the tube body characterized by a plurality of stiffening ribs which extend inboardly as radial extensions of at least some of the key surfaces, said ribs exhibiting an axial thickness dimension defined by a first acute angle having a center located at a point on the tube body axis such as to establish an outboard straight line surface of revolution of the cone-shaped outboard end and, a second acute angle having a center located at a point on the tube body axis such as to establish an inboard straight line surface of revolution which is intermittent and defines the inboard extent of each of the backplate ribs, said backplate flange exhibiting an axial thickness dimension between adjacent ribs defined by a third acute angle having a center located at a point on the tube body axis such as to establish an inboard straight line surface of revolution between the ribs.

2. The torque tube as set forth in claim 1 wherein each of the plurality of key surfaces exhibits a transverse width dimension of "W" and each of the stiffening ribs exhibits a transverse width dimension across its inboard straight line surface of revolution of "$W_2$" and wherein $W < W_2$.

3. The torque tube as set forth in claim 2 wherein each of the key surfaces is flared out to meet the width of a rib.

4. The torque tube as set forth in claim 1 wherein the first acute angle is less than the second acute angle and the third acute angle varies independently within the range of 0°–90°.

5. The torque tube as set forth in claim 1 wherein the first acute angle is greater than the second acute angle and the third acute angle varies independently within the range of 0°–90°.

6. The torque tube as set forth in claim 1 wherein the first and second acute angles are equal angles and the third acute angle varies independently within the range of 0°–90°.

7. The torque tube as set forth in claim 1 wherein the first acute angle is within the range of 35°–85° and the second acute angle is within the range of 45°–90°.

8. The torque tube as set forth in claim 1 wherein the first acute angle is within the range of 55°–75° and the second acute angle is within the range of 62°–82°.

9. The torque tube as set forth in claim 1 wherein the first acute angle is within the range of 63°–73° and the second acute angle is within the range of 67°–77°.

10. The torque tube as set forth in claim 1 wherein each of the plurality of key surfaces exhibits a transverse width dimension of "$W_1$" which includes a longitudinal slot through the lengthwise extent of a key and each of the stiffening ribs exhibits a transverse width dimension across the inboard straight line surface of revolution of "$W_2$" and wherein $W_1 \leq W_2$.

11. The torque tube as set forth in claim 1 wherein the key surfaces comprise a first set of keys each of which exhibits a transverse width dimension of "W" and a second set of keys each of which exhibits a transverse width dimension of "$W_1$", said keys of width "$W_1$" including a longitudinal slot through the length thereof and each of the ribs is an outboard radial extension of key surfaces of widths "$W_1$", each said rib exhibiting a transverse width dimension across the inboard straight line surface of revolution of "$W_2$" and wherein $W_1 \leq W_2$.

12. In an aircraft wheel and brake system including a multi-disk stack of braking elements wherein various disks are keyed for rotation with a wheel and other disks are keyed to a fixed torque tube secured to a relatively stationary member of the system, an improved configuration for a torque tube comprising in combination:

a substantially cylindrically-shaped tube body having a central longitudinal axis and a plurality of keying surfaces axially oriented and longitudinally extending from an inboard end towards an outboard end, said keying surfaces extending radially for engagement with various disks of the brake disk stack;

a radially depending flange at the inboard end of the tube body adapted for securing the body to a stationary member of the wheel and brake system; and a radially extending backplate flange at the outboard end of the tube body characterized by a substantially cone-shaped configuration defined by a plurality of stiffening ribs which extend axially inboardly and are radial extensions of at least some of the keying surfaces, said ribs having an axial thickness dimension defined by a first acute angle having a center located at a point on the tube axis such as to establish an outboard straight line surface of revolution which is continuous about the outboard end of the tube body and, a second acute angle having a center located at a point on the tube body axis such as to establish an inboard straight line surface of revolution which is intermittent and defines the inboard extents of each of the plurality of ribs, said backplate flange having an axial thickness dimension between the ribs defined by a third acute angle having a center located at a point on the tube axis such as to establish an inboard straight line surface of revolution between the ribs.

13. The torque tube as set forth in claim 12 wherein the first and second acute angles are such as to result in a rib configuration having an axial thickness dimension which decreases as this dimension is measured radially from the tube axis.

14. The torque tube as set forth in claim 12 wherein the first and second acute angles are such as to result in a rib configuration having an axial thickness dimension which increases as this dimension is measured radially from the tube axis.

15. The torque tube as set forth in claim 12 wherein the first and second acute angles are equal angles and the rib configuration has an axial thickness dimension which is substantially constant as this dimension is measured radially from the tube axis.

16. The torque tube as set forth in claim 12 wherein the first acute angle is within the range of 55°–85° and the second acute angle is within the range of 45°–90°.

17. The torque tube as set forth in claim 12 wherein each key surface has a transverse width dimension of "W" and each rib has a transverse width dimension across the inboard straight line surface of revolution of "$W_2$" and wherein $W < W_2$.

18. The torque tube as set forth in claim 12 wherein each key surface has a transverse width dimension of "$W_1$" which includes a longitudinal slot throughout the length of the key surface and the stiffening ribs have a transverse width dimension across the inboard straight line surface of revolution of "$W_2$" and wherein $W_1 \leq W_2$.

19. The torque tube as set forth in claim 12 wherein the key surfaces comprise a first set of keys exhibiting a transverse width dimension of "W" and a second set of keys exhibiting a transverse width dimension of "$W_1$", said second set of key surfaces each including a longitudinal slot which extends the length thereof and the stiffening ribs are radial extensions of the key surfaces exhibiting a width "$W_1$", said ribs having a transverse width dimension across the inboard straight line surface of revolution of "$W_2$" and wherein $W_1 \leq W_2$.

20. A torque tube as may be applied to a wheel and brake assembly comprises a radially extending outboard backplate flange characterized by a plurality of stiffening ribs which extend axially in an inboard direction and exhibit an axial thickness dimension defined by a pair of acute angles, a first acute angle having a center located at a point on an axis of the tube such as to establish a straight line surface of revolution which is continuous about the outboard end of the tube while a second acute angle has a center located at a point on the same axis such as to establish an inboard straight line surface of revolution which is intermittent and defines the inboard extent of the ribs, said backplate flange exhibiting an axial thickness dimension between the ribs defined by a third acute angle which has a center located at a point on the same axis such as to establish an inboard surface of revolution between the the ribs.

21. The torque tube as claimed in claim 20 wherein the first acute angle is within the range of 35°-85° and the second acute angle is within the range of 45°-90°.

22. The torque tube as claimed in claim 21 wherein the first acute angle is less than the second acute angle and the third acute angle varies independently within the range of 0°-90°.

23. The torque tube as claimed in claim 21 wherein the first acute angle is greater than the second acute angle and the third acute angle varies independently within the range of 0°-90°.

24. The torque tube as claimed in claim 21 wherein the first acute angle and the second acute angle are equal angles and the third acute angle varies independently within the range of 0°-90°.

25. The torque tube as claimed in claim 21 wherein the overall weight of the tube is decreased by a provision of through-bores in the backplate flange in the portions between the ribs as defined by the third acute angle.

* * * * *